US012811925B2

(12) United States Patent
Colosky et al.

(10) Patent No.: US 12,811,925 B2
(45) Date of Patent: Nov. 24, 2026

(54) SYSTEM AND METHOD FOR REMOTELY ACTIVATING AUTONOMOUS ACTIONS BY WORK MACHINES

(71) Applicant: Deere & Company, Moline, IL (US)

(72) Inventors: Andrew M. Colosky, Urbandale, IA (US); Tyler J. Van Steenhuyse, Urbandale, IA (US); Cameron Whipple, Urbandale, IA (US)

(73) Assignee: Deere & Company, Moline, IL (US)

(*) Notice: Subject to any disclaimer, the term of this patent is extended or adjusted under 35 U.S.C. 154(b) by 75 days.

(21) Appl. No.: 18/822,133

(22) Filed: Aug. 31, 2024

(65) Prior Publication Data

US 2026/0067265 A1 Mar. 5, 2026

(51) Int. Cl.
*H04L 9/40* (2022.01)
*E02F 9/20* (2006.01)

(52) U.S. Cl.
CPC .......... *H04L 63/0807* (2013.01); *E02F 9/205* (2013.01)

(58) Field of Classification Search
CPC ...... H04L 63/12; H04L 63/0807; H04L 63/08
See application file for complete search history.

(56) References Cited

U.S. PATENT DOCUMENTS

| | | | |
|---|---|---|---|
| 8,555,843 | B2 | 10/2013 | Klousia et al. |
| 8,647,235 | B2 | 2/2014 | Thomas et al. |
| 8,899,031 | B2 | 12/2014 | Turnis et al. |
| 9,504,212 | B2 | 11/2016 | Michael et al. |
| 10,328,898 | B2 | 6/2019 | Golsch et al. |
| 10,647,296 | B2 | 5/2020 | Golsch et al. |
| 11,572,038 | B2 | 2/2023 | Golsch |
| 11,639,142 | B2 | 5/2023 | Tillman et al. |
| 2005/0033962 | A1 | 2/2005 | Libin et al. |
| 2008/0254939 | A1 | 10/2008 | Ichimura |
| 2013/0024080 | A1 | 1/2013 | Robinson |

(Continued)

OTHER PUBLICATIONS

Extended European Search Report and Written Opinion issued in European Patent Application No. 25190588.1 dated Nov. 7, 2025, in 10 pages.

*Primary Examiner* — Beemnet W Dada
*Assistant Examiner* — Sayeda Salma Nahar
(74) *Attorney, Agent, or Firm* — Gary L. Montle; Lucian Wayne Beavers; Patterson Intellectual Property Law, PC

(57) ABSTRACT

Systems and methods are provided for securely activating actions by work machines, independent of distance between the machines and users requesting the actions. An authentication network is established between a host server, authorized users, and work machines, wherein authorized user computing devices are assigned authentication keys. A user sends a first message to the host server comprising requested actions by an identified work machine and signed with an authentication key. The host verifies authenticity of the first message, optionally adds a host signature, and transmits the verified message to the work machine. The machine controller verifies authenticity of the first message and conditionally generates a second message comprising a confirmation challenge to the user. If the user responds satisfactorily to the challenge, the machine executes the requested actions, for example relating to startup/shutdown, access control, autonomous control of operations, adjustments to machine settings, and the like.

20 Claims, 2 Drawing Sheets

(56) References Cited

U.S. PATENT DOCUMENTS

| | | | | |
|---|---|---|---|---|
| 2013/0079194 | A1 | 3/2013 | Thomas et al. | |
| 2013/0311074 | A1 | 11/2013 | Siira | |
| 2014/0013407 | A1 | 1/2014 | Tilly et al. | |
| 2014/0270172 | A1 * | 9/2014 | Peirce | H04L 9/0819 380/270 |
| 2016/0182487 | A1 * | 6/2016 | Zhu | H04L 63/083 726/9 |
| 2017/0058922 | A1 | 3/2017 | Kenkel et al. | |
| 2023/0262582 | A1 | 8/2023 | Lizewski et al. | |
| 2025/0232366 | A1 * | 7/2025 | Rule | G06Q 20/108 |

* cited by examiner

SYSTEM AND METHOD FOR REMOTELY ACTIVATING AUTONOMOUS ACTIONS BY WORK MACHINES

FIELD OF THE DISCLOSURE

The present disclosure relates to the secure transmission and authentication of remote commands to work machines. More particularly, the present disclosure relates to systems and methods utilizing a hosted digital authentication key framework for activating autonomous actions by work machines, independent of a distance between the commanding user and the work machine to perform the action.

BACKGROUND

The term "work machine" as used herein may typically connote work vehicles in the context of construction (e.g., excavators, loaders), agriculture (e.g., combine harvesters, windrowers, sprayers), forestry (e.g., feller bunchers), and the like, self-propelled or otherwise, but may further include various alternative forms of work machines in other fields as may be understood by one of skill in the art upon review of the present disclosure.

Users and administrators of such work machines, as well as fleets thereof, often have a desire to remotely initiate actions such as startup of their fleet to enable the work machines to get to operational temperatures before the day starts. Remote starting features can assist in job efficiency by preparing a construction machine ahead of an operator's arrival, for example getting the hydraulic oil and engine temperatures to working levels prior to machine utilization. On particularly hot days the remote startup feature may assist with job efficiency in different ways, for example by starting the engine to cool down the cab, and thereby enabling the operator to better handle machine tools therein.

However, conventional designs create a security challenge, one example of which may include authorization and authentication of remote commands being solely owned in the cloud infrastructure. In addition, certain types of work machines and associated applications may typically have safety precautions which effectively prevent conventional remote starting features, or otherwise make such features imprudent or impractical in many cases.

BRIEF SUMMARY OF THE DISCLOSURE

The current disclosure provides an enhancement to conventional systems, at least in some embodiments by utilizing a digital key framework such as for example that developed by the Car Connectivity Consortium (CCC) to provide a secure mechanism to activate remote start of a work machine from a location that is distant from the machine. Importantly, a system and method as disclosed herein differs from conventional tools at least in that it does not require proximity of the user, and accordingly does not require the use of proximity-based technologies such as Ultra-Wide Band (UWB) and Bluetooth Low Energy (BLE).

In an embodiment as disclosed herein, a method is provided for securely activating actions by work machines, substantially independent of a distance between the work machines and a user requesting the actions, using an authentication network established between a host server and one or more user computing devices on a first end, and between the host server and one or more work machines on a second end, wherein each of the one or more user computing devices is associated with at least one authentication key. A first message is received from a first device of the one or more user computing devices at the host server, wherein the first message comprises one or more requested actions by an identified work machine of the one or more work machines and is associated with an authentication key. Upon verifying authenticity of the first message at the host server, the first message is transmitted to a machine computing device associated with the identified work machine. Upon verifying authenticity of the first message and the one or more requested actions at the machine computing device, a second message is conditionally generated comprising a confirmation challenge. The machine computing device receives a third message comprising data provided via the first device in reply to one or more challenge-specific parameters associated with the confirmation challenge, and upon verifying authenticity of the data in the third message at the machine computing device, generates one or more control signals causing the one or more requested actions to be automatically performed with respect to the identified work machine.

In one exemplary aspect according to the above-referenced method embodiment, upon verifying authenticity of the first message at the host server, a host signature may be provided to the first message which is then transmitted to the machine computing device.

In another exemplary aspect according to the above-referenced method embodiment, verifying authenticity of the first message and the one or more requested actions at the machine computing device may comprise verifying a first device signature using the authentication key and the host signature.

In another exemplary aspect according to the above-referenced method embodiment, the second message may be transmitted from the machine computing device to the host server, and further transmitted from the host server to the first device.

In another exemplary aspect according to the above-referenced method embodiment, the one or more challenge-specific parameters may be associated with the confirmation challenge at the machine computing device.

In another exemplary aspect according to the above-referenced method embodiment, the second message may be generated based on determining a proximity-based condition from respective locations of the first device and the identified work machine.

In another exemplary aspect according to the above-referenced method embodiment, the second message may be generated based on determining a likelihood-based condition from one or more of: a time of day; historical usage patterns; historical user commands; and combinations thereof.

In another exemplary aspect according to the above-referenced method embodiment, upon transmitting the first message from the host server to the machine computing device associated with the identified work machine, the machine computing device may be awakened from a first state to a second state. Upon failing to verify the authenticity of the first message and the one or more requested actions at the machine computing device, or the authenticity of the data in the third message, the machine computing device may return from the second state to the first state.

In another exemplary aspect according to the above-referenced method embodiment, the machine computing device may comprise a telematics unit and a controller, wherein the telematics unit is awakened from the first state to the second state to receive the first message, the telematics unit in the second state further awakens the controller, and the controller, upon verifying the authenticity of the first message and the one or more requested actions, further conditionally generates the second message comprising the confirmation challenge.

In another exemplary aspect according to the above-referenced method embodiment, the one or more requested actions performed at the identified work machine may comprise a specified startup sequence or shutdown sequence.

In another exemplary aspect according to the above-referenced method embodiment, the one or more requested actions performed at the identified work machine may comprise changes to one or more work machine operation settings.

In another exemplary aspect according to the above-referenced method embodiment, the one or more requested actions performed at the identified work machine comprise selective user access, or prevention thereof, with respect to specified portions of the identified work machine.

In another embodiment as disclosed herein, a system comprises a host server and one or more work machine computing devices each having associated processors and collectively configured to direct the performance of steps in a method according to the above-referenced embodiment and optionally one or more of the related aspects.

In one exemplary aspect according to the above-referenced system embodiment, the system may comprise a computer program product residing on one or more user devices and executable to direct one or more steps of the method according to the above-referenced embodiment, partially with respect to the above-referenced steps, and/or relating to additional steps.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
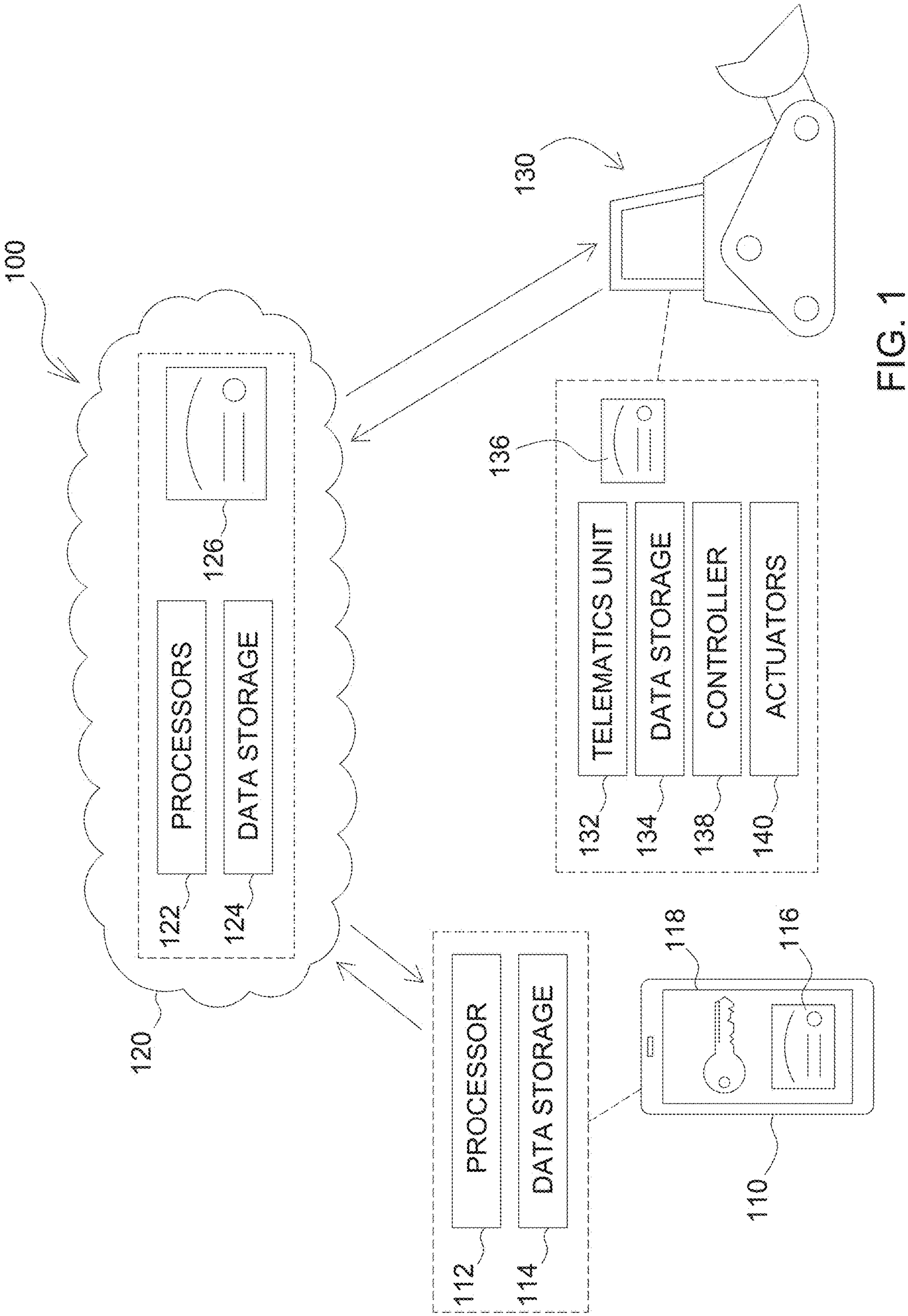
FIG. 1 is a graphical diagram representing aspects of an exemplary hosted system according to the present disclosure.

Referring now to the drawings and particularly to FIG. 1, a representative system including a remote action architecture is shown and generally designated by the number 100.

Embodiments of the system 100 as disclosed herein may generally include one or more user computing devices 110, one or more servers 120 (e.g., a cloud server network), and one or more work machines 130. Generally speaking, a system 100 as disclosed herein may include a trusted network of devices effective to validate and perform remotely commanded functions as further described below, wherein the trusted network associated with any one of the user computing devices 110 may include one or more servers 120 associated with a host entity and a defined set of one or more work machines 130 in a fleet.

In various embodiments, user computing devices 110 may be implemented as at least one of a server computer, a server device, a desktop computer, a laptop computer, a smart phone, or any other electronic device having a user interface 118 with a display unit, as well as a processor 112 capable of executing instructions and data storage 114 capable of storing authentication information 116 such as for example an authentication key.

The authentication key in various embodiments may be a digital key or equivalent token in the context of conventional frameworks. As but one example, the authentication (digital) key may be provided and used in a manner consistent with a digital key framework developed by the Car Connectivity Consortium, but as further noted herein with various (if not all) message transmission and authentication functions to and from the user computing device 110 and the work machine 130 requiring interaction with and facilitation by an intervening hosted server 120.

A processor 112 (such as a microprocessor) of the user computing device 110 may be a generic hardware processor, a special-purpose hardware processor, or a combination thereof. In embodiments having a generic hardware processor (e.g., as a central processing unit (CPU), the generic hardware processor may be configured to be converted to a special-purpose processor by means of being programmed to execute and/or by executing instructions such as a particular algorithm in the manner discussed herein for providing a specific operation or result.

The host server 120, which may be referred to herein as a "server" but without limiting the scope of the present disclosure thereto and expressly contemplating that a host server may encompass multiple servers in a distributed computing architecture such as a cloud network, may be configured to store sets of information and/or metadata usable by the system 100 to perform or assist in performing one or more operations or functionality described herein. The host server 120 may be configured at least to manage the respective life cycles of authentication keys provided to various users, and further direct the performance of steps associated with message requests as further described herein. The host server 120 may be configured in various embodiments to operate remotely and may be configured to obtain or otherwise operate upon one or more instructions stored physically remote from each of the user computing devices 110 (e.g., via client-server communications and/or cloud-based computing). The host server 120 may include one or more processors 122, and data storage 124 (resident or otherwise functionally linked thereto) having further authentication information 126 such as for example corresponding to a host signature applicable in a manner as further described below.

The work machines 130 as referenced herein may be any of many types of work machines, including, and without limitation, work vehicles such as construction machines (e.g., skid steer loader, four wheel drive (4WD) loader, excavator, backhoe loader, bulldozer, and the like), agricultural machines (e.g., combine harvesters, forage harvesters, windrowers, mower-conditioners, and the like), forestry machines (e.g., feller bunchers, etc.), having distinctions in their respective components and as may be appreciated by one of skill in the art. A work machine 130 is not necessarily a self-propelled vehicle and may also include towed or pushed machines, as well as units that are static or otherwise do not require movement through or across an area for functionality. In various embodiments, each of the work machines 130 in a given fleet of work machines may include respective telematics units 132, and data storage 134 upon which authentication information 136 as further described below may be stored.

In an embodiment, a telematics unit 132 may be provided as part of or otherwise functionally linked to a vehicle control system further including a controller 136, via for example a CAN bus arrangement or other equivalent forms of electrical and/or electro-mechanical signal transmission, or in some embodiments via a wireless communications system and associated components as are conventionally known in the art.

The telematics unit 132, which may in some embodiments include or otherwise connect an intervening modem or cellular device (not shown), transmits data to and receives data from the hosted server 120 by a long range wireless signal using a communications network. Network connections may be established in any manner, and utilizing any number of associated communications standards, as conventionally known in the art, including but not limited to satellite networks, 5G, long-term evolution (LTE) (4G), global system for mobile communications (GSM) (3G & 2G), code-division multiple access (CDMA) (3G & 2G), wide-area network (WAN), combinations of the same, etc.

The controller 136 may be configured to generate control signals for controlling the operation of respective actuators 138, or signals for indirect control via intermediate control units, for example corresponding to remotely commanded functions as disclosed herein and associated controllable elements. The controller 136 may for example be electrically coupled to respective components of these and/or other systems by a wiring harness such that messages, commands, and electrical power may be transmitted between the controller 136 and the remainder of the work machine 130. The controller 136 may be coupled to other controllers, such as for example an engine control unit (ECU), through a controller area network (CAN) bus, and may then send and receive messages over the CAN bus to communicate with other components thereof. It is understood that the controller described herein may be a single controller having all of the described functionality, or it may include multiple controllers wherein the described functionality is distributed among the multiple controllers.

Various operations, steps or algorithms as described in connection with the system 100 and performed by one or more of the elements 110, 120, 130 therein can be embodied directly in hardware, in a computer program product such as a software module executed by one or more of the processors 112, 122, controller 138, or in a combination thereof. The computer program product can reside in RAM memory, flash memory, ROM memory, EPROM memory, EEPROM memory, registers, hard disk, a removable disk, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

Data storage 114, 124, 134 as discussed herein may, unless otherwise stated, generally encompass hardware such as volatile or non-volatile storage devices, drives, memory, or other storage media, as well as one or more databases residing thereon.

Figure 2:
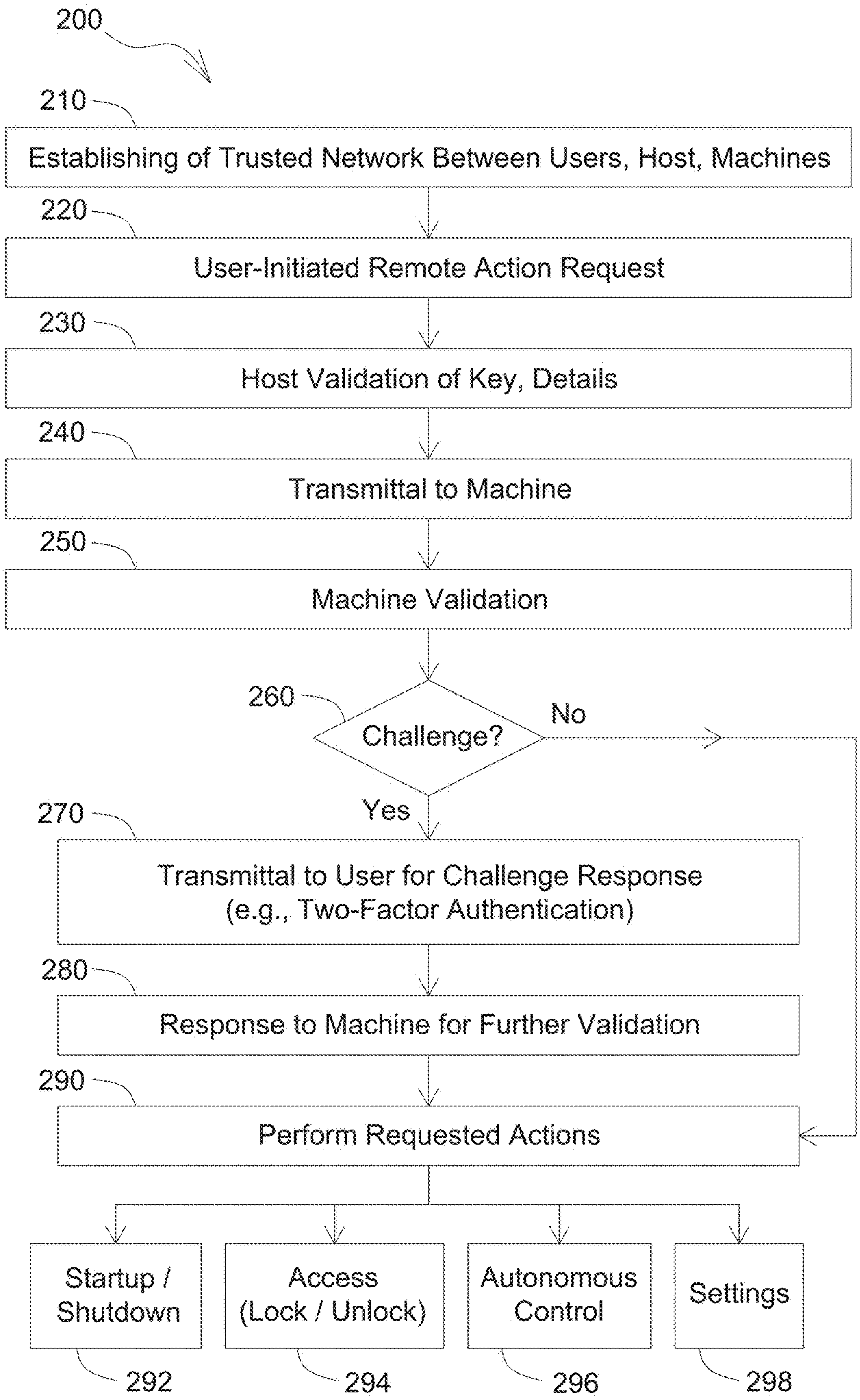
FIG. 2 is a flowchart representing an exemplary method according to the present disclosure.

Referring next to FIG. 2, the depicted flowchart represents an exemplary embodiment of a method 200 for remotely commanding actions and associated functions for a work machine 130. The method 200 may for illustrative purposes be described as executed in accordance with an embodiment of the system 100 as represented in FIG. 1 and described above, but is not expressly limited thereto unless otherwise specifically noted herein. While the illustrated embodiment may include a specific arrangement of steps, inputs, outputs, and the like, it may be understood that certain steps may be combined, performed in a different order, or even omitted altogether in other embodiments within the scope of the present disclosure, unless otherwise specifically noted herein.

The illustrated embodiment of the method 200 begins with a step 210 of establishing a trusted network between at least a first user computing device 110, a host server (or network of hosted servers) 120, and at least a first work machine 130. In various embodiments, a first network is established between the first user computing device 110 and the hosted server 120, and a second network is established between the hosted server 120 and the at least first work machine 130, wherein no network is directly established between the user computing devices 110 and the work machines 130, but wherein the hosted server 120 authenticates messages from the user computing device 110, and further enables authentication of the messages from the user computing device 110 by the work machine 130.

As part of this step, the user computing device 110 may be provided with a digital authentication key 116, which may for example be provided from the host and unique with respect to the user computing device 110.

The digital authentication key 116 may be specific to a user, or may be provided for an application resident on the user computing device 110 and available without limitation to any users that can use the application and/or device.

The digital authentication key 116 may also be specific to a work machine 130 or may be commonly associated with each of a plurality of work machines defining a fleet.

The digital authentication key 116 may be specific to one or more actions which can be remotely commanded by the user associated with the user computing device 110, or may enable any remotely commanded actions, for example as may further be appropriate in view of any other conditions.

The user computing device 110 may in some embodiments accordingly be provided with a plurality of authentication keys 116, selection from which may be enabled via the user interface 118 in association with requests for specific actions, and/or by specific work machines 130. Alternatively, the user computing device 110 may be provided with a single authentication key 110 which is used in accordance with each of various requested actions and/or work machines 130.

The illustrated embodiment of the method 200 continues with a step 220 wherein a user, via a respective user computing device 110 in the trusted network, initiates a remote action request. In an embodiment, a software application residing on or otherwise accessible via the user computing device 110 includes a user interface 118 which enables the request and any one or more selectable options for the actions to be performed, information to be provided for verifying the request, etc. In accordance with the remote action request, a message may be created and signed with the digital authentication key 116 assigned to the user computing device 110 (or user). The message may further include information associated with the request, including for example a work machine identifier, an authentication key identifier, a remote action identifier, a user location, and the like, as may be needed to identify, verify, and ultimately perform the requested action(s).

The illustrated embodiment of the method 200 continues with a step 230 wherein the message including the remote action request is routed to the hosted server 120 and validated by the host. The hosted server 120 may for example be configured to confirm and ultimately approve details associated with the request.

One such task may include confirming validity of the digital authentication key 116, such as for example whether or not the key has exceeded an expiration date, a number of available uses, or the like.

Another such detail may include confirming whether the digital authentication key 116 provides permission for the specified remote commands.

The hosted server 120 may confirm whether organizational settings exist and potentially conflict with the requested actions. For example, remote starts for work machines in a fleet may be collectively disabled before a specified time, such as 6 a.m.

The hosted server 120 may confirm whether the current location of the user computing device 110 conflicts with the requested action. For example, if the message originates from a device outside of a specified jurisdiction, the request may be denied or additional information required to verify the initial message.

Alternatively, the hosted server 120 may only selectively approve certain commands based on a proximity between the user computing device 110 and the work machine 130 at issue, such as for example where a startup request is provided to put the work machine 130 into condition for an upcoming operation, but the hosted server 120 recognizes that the authorized user is not effectively proximate to the work machine 130 and therefore it would be wasteful to fully start up the work machine 130 at present. As in many cases this step would be performed prior to an initiated communication between the host server 120 and the work machine 130 at issue, the hosted server 120 may determine user proximity to the work machine 130 based on a last reported work machine location.

The illustrated embodiment of the method 200 continues with a step 240 wherein, if the message from the user computing device 110 has been approved by the hosted server 120, the message is then routed to the work machine 130. In an embodiment, the hosted server 120 looks up routing information for the work machine 130 at issue, generates a first communication to wake up the telematics unit 132 for the work machine 130, and then transmits the message itself to the telematics unit 132.

The message in this context may effectively be the same message that was generated from the user computing device 110. In an embodiment, the hosted server 120 does not supplement the transmitted message, but rather the transmittal of the message itself conveys to the work machine 130 that the host has confirmed the details and approved the request.

In another embodiment, the host server 120 may further sign the message with a host signature key to validate that the request has been reviewed and approved.

The illustrated embodiment of the method 200 continues with a step 250 wherein the work machine 130 validates the message and the corresponding request. In an embodiment, the telematics unit 132 is configured, upon having been woken itself and received the message, to validate the authenticity of the message, for example referencing stored authentication information 136, and further awaken the respective controller 138 for the work machine 130 and notify it of the remote action request. The controller 138 may be configured upon receiving the message to validate that the requested action is from a valid authentication key 116 and is also a valid action to be requested to be performed by the work machine 130, for example at least under present conditions.

In embodiments wherein the host server 120 has signed the message with a host signature key 126, the telematics unit 132 may validate authenticity of the host signature key 126 before transmitting the message to the controller 138, which further validates that the requested action is from a valid authentication key 116 and is also a valid action to be requested by the work machine 130, for example at least under present conditions. Alternatively, the message may be transmitted to the controller 138 without the preliminary validation of the host signature key 126, wherein the controller 138 performs this step as well.

The illustrated embodiment of the method 200 continues with a step 260 wherein a challenge message may be required to confirm validation of the message and the requested actions. In various embodiments, such a challenge may not be required for any such requests to a specified work machine 130, or all such requests may require a challenge message, or the challenge message may be conditionally required based on the context of the requested actions, location of the user computing device 110, or the like.

In an embodiment, the work machine 130, for example the controller 138 or other processor associated with the work machine, may determine that a challenge is required to confirm the requested action based on a location of the user computing device 110 being outside of a specified proximity or other bounds, geolocation, etc. The work machine 130 may for example generate a challenge for any messages received from a location remote from a work site in which the work machine is located. The work machine 130 may for example determine that a requested action requires a period of time to complete, further determines an amount of time before which the requested action will need to be completed, and then generate a challenge requesting confirmation that the requested action should still be initiated, requesting confirmation as to when the requested action should be initiated, etc.

In an embodiment, the work machine 130 may generate a challenge based on the time of day, or even day of the week, or other variables which may generally require confirmation as to the validity of the requested action. For example, the work machine 130 may accept a startup request that is received on a Monday morning, while challenging or otherwise requiring confirmation for the same type of request on a Sunday evening. The work machine may in an embodiment receive a startup request including commands to adjust climate controls and warm up the operator cab, but generate a challenge message informing the requesting user of the ambient temperature and requesting confirmation, where for example the ambient temperature may be above a certain level.

In an embodiment, following up on the above-referenced examples, the work machine 130 may be configured to identify patterns in usage and/or remotely requested actions over time, and generate challenge messages based in part on the requested actions being deemed less likely or credible in view of the identified patterns.

If no challenge is required (i.e., "no" in response to the query in step 260), the method 200 may proceed to step 290, wherein the requested actions are automatically performed.

If a challenge is required (i.e., "yes" in response to the query in step 260), the illustrated embodiment of the method 200 continues with a step 270 wherein the controller 138 at the work machine 130 generates a challenge message, and the telematics unit 132 transmits the challenge message to an initial endpoint associated with the host server 120. The host server 120 may further in some embodiments automatically forward the challenge message to the user computing device 110, for example prompting the user via the same application that was used to generate the initial message, or by pushing the challenge message to a messaging service associated with the same application or another application that the hosted server 120 recognizes as being associated with the user.

In another embodiment, the hosted server 120 may not automatically push the challenge message out to the user, but rather the application associated with the user computing device 120 may continuously or periodically generate status queries via an application program interface subsequent to transmittal of the initial message, wherein the challenge message is transmitted to the user in response to a query, or wherein the host server 120 makes the user aware that a challenge has been requested in response to a query and enables user selection and response to the challenge via the user interface 118.

The illustrated embodiment of the method 200 continues with a step 280 wherein the user computing device 110 generates a response specific to the challenge message. In various embodiments, the challenge message may be appropriately responded to using one or more keystrokes from the user interface 118 on the user computing device 110, such as for example a dedicated prompt generated on the display unit, a prompt to obtain an alphanumeric string for entry via the user interface 118, or the like. The generated response from the user computing device 110 may then be routed back to the work vehicle 130 via the hosted server 120, for example using a cloud connection and associated application program interface.

In an embodiment, the hosted server 120 may optionally be omitted from the challenge sequence. For example, the telematics unit 132 on the work machine 130 may be configured to determine a phone number or other messaging identifier associated with the requesting user and transmit the challenge directly to the user via a messaging service, or to transmit the challenge directly within the hosted application and without intervening nodes including the hosted server 120.

Finally, in step 290 of the method 200, the work machine 130 executes the requested actions. In an embodiment, a single controller (identified above as controller 138) may be responsible for authenticating the message and associated actions, and further generating the control signals for execution or performance of the requested actions. In another embodiment, the work machine 130 may include an authentication controller (not specifically shown as such in FIG. 2) which is awakened by the telematics unit 132 and performs the authentication portions of the method at the work machine 130, and which is separate from a machine control unit or vehicle control unit (not specifically shown as such in FIG. 2) which is configured to perform the specified actions themselves. In such embodiments, the authentication controller may for example authenticate that the message itself is valid, whereas the machine controller itself further initiates vehicle and local system checks to validate that the remote action request is appropriate for the work machine 130 in view of current conditions.

Exemplary such actions may include a startup or shutdown process (step 292). In some embodiments, this may comprise one or more actions which can be performed at one time, such as adjustments to climate settings, adjustments to user preference settings, etc. In some embodiments, this may comprise a sequence of actions to be performed over time. For example, and particularly in extremely cold environments, it may be necessary to heat the hydraulic system in stages, wherein the engine starts at a low idle and then increases over time as the hydraulic system heats appropriately.

In an embodiment, a single startup request may be submitted to initiate customized startup actions or sequences for each of a plurality of work machines 130 in a fleet. As one illustrative example, a user may be associated with a fleet of construction equipment and needs to get a designated group of work machines 130 warmed up so they can be ready to start the day when their respective operators arrive. From her home office and via a device 110 such as her smart phone, the user can initiate a remote start request to the work machines 130 about fifteen minutes before the start of the shift. If the present day is particularly cold outside, she may set the climate controls to get the cabs warm for her operators. The work machines 130 may be set to remain locked until the respectively authorized operator arrives at their machine 130 to begin their shift. Each work machine 130 may further be configured to identify an expected arrival time for the respective operator, and to adjust its respective startup times accordingly.

Another exemplary action to be performed by the work machine 130 according to an authorized request may include selective access to one or more portions of the work machine 130 (step 294), for example locking or unlocking one or more access points, enabling or disabling one or more otherwise manually activatable functions, or the like.

Another exemplary action to be performed by the work machine 130 according to an authorized request may include autonomous control functions (step 296), such as by directing the work machine 130 to a specified operating mode wherein a predetermined control function is executed.

As one illustrative example, a user may notice that her autonomous tractor has sent her an alert that it needs fuel and an air filter change. She drives a service vehicle for her farm out to the field where the work machine 130 (e.g., tractor) is performing a tillage operation and stops at the field access. She can see a dust cloud on the horizon as the tractor steadily works about a half mile from her in the south end of the field. She pulls out her phone to notify the tractor that it needs to pause its current job and head to her end of the field.

Another exemplary action to be performed by the work machine 130 according to an authorized request may include adjusting one or more work machine settings (step 298), such as for example a specified setting via the user interface 118 of the user computing device 110, or a collective group of settings or a software update.

Such actions may in various embodiments not specifically require adjustments to made but include queries for settings such as for example a diagnostics check and corresponding reporting, license management, remote display access, and the like. The work machine 130 may respond to queries in this context including a current battery charge, fluid and filter monitoring checks, fault monitoring outputs for one or more components of the work machine 130 relevant to a current or requested work operation, or the like.

In an embodiment, the work machine 130 may be configured to capture one or more images using cameras mounted in respective locations about the machine, and to transmit the images in a report accessible by the user. The images may be transmitted automatically in response to the request, or in some embodiments may be conditionally transmitted, based for example on predetermined alert functions or in response to a specific query associated with the request. For example, the user in generating the request may query the work machine 130 for any images relating to specified conditions, wherein the work machine controller 138 may be configured to perform image processing and determine whether the images captured pursuant to the request are to be transmitted.

In various embodiments, the image processing capabilities of the work machine 130 may be supplemented by input data from other sources. For example, where the user request is for images associated with specified objects in a work area associated with the work machine 130, the work machine 130 may further rely on inputs from an object detection system to confirm any objects determined to be present from analysis of the images themselves.

Although not shown in FIG. 2, in various embodiments the work machine controller 138 may be configured to transmit, via the telematics unit, a status message back to the hosted server 120 indicating that the actions have been performed, or a status of the actions where for example there is a delay imposed or one or more actions cannot be performed due to current conditions. The status, having been reported back to the cloud, may for example be available for review by the user via the application and corresponding user interface 118 on the user computing device 110. Alternatively, the hosted server 120 may generate a notification to the user computing device 110 corresponding to a status of the message and/or requested actions.

Thus, one of skill in the art may appreciate that an apparatus and/or methods according to the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments, unless otherwise specifically stated.

What is claimed is:

1. A method for securely activating actions by self-propelled work vehicles, independent of a distance between the work vehicles and a user requesting the actions, the method comprising:

establishing an authentication network between a host server and one or more user computing devices on a first end, and between the host server and one or more self-propelled work vehicles on a second end, wherein each of the one or more user computing devices is associated with at least one authentication key;

receiving a first message from a first device of the one or more user computing devices at the host server, wherein the first message comprises one or more requested actions by an identified self-propelled work vehicle of the one or more self-propelled work vehicles and is associated with an authentication key;

upon verifying authenticity of the first message at the host server, transmitting the first message to a machine computing device associated with the identified self-propelled work vehicle;

upon verifying authenticity of the first message and the one or more requested actions at the machine computing device, conditionally generating a second message comprising a confirmation challenge;

receiving at the machine computing device a third message comprising data provided via the first device in reply to one or more challenge-specific parameters associated with the confirmation challenge; and upon verifying authenticity of the data in the third message at the machine computing device, generating one or more control signals causing the one or more requested actions to be automatically performed with respect to the identified self-propelled work vehicle.

2. The method of claim 1, wherein upon verifying authenticity of the first message at the host server, a host signature is provided to the first message which is then transmitted to the machine computing device.

3. The method of claim 2, wherein verifying authenticity of the first message and the one or more requested actions at the machine computing device comprises verifying a first device signature using the authentication key and the host signature.

4. The method of claim 1, wherein the second message is transmitted from the machine computing device to the host server, and further transmitted from the host server to the first device.

5. The method of claim 4, wherein the one or more challenge-specific parameters are associated with the confirmation challenge at the machine computing device.

6. The method of claim 1, wherein the second message is generated based on determining a proximity-based condition from respective locations of the first device and the identified self-propelled work vehicle.

7. The method of claim 1, wherein the second message is generated based on determining a likelihood-based condition from one or more of: a time of day; historical usage patterns; historical user commands; and combinations thereof.

8. The method of claim 1, wherein, upon transmitting the first message from the host server to the machine computing device associated with the identified self-propelled work vehicle, the machine computing device is awakened from a first state to a second state.

9. The method of claim 8, wherein upon failing to verify the authenticity of the first message and the one or more requested actions at the machine computing device, or the authenticity of the data in the third message, the machine computing device returns from the second state to the first state.

10. The method of claim 1, wherein:

the machine computing device comprises a telematics unit and a controller;

the telematics unit is awakened from the first state to the second state to receive the first message;

the telematics unit in the second state further awakens the controller; and the controller, upon verifying the authenticity of the first message and the one or more requested actions, further conditionally generates the second message comprising the confirmation challenge.

11. The method of claim 1, wherein the one or more requested actions performed at the identified self-propelled work vehicle comprise a specified startup sequence or shutdown sequence.

12. The method of claim 1, wherein the one or more requested actions performed at the identified self-propelled work vehicle comprise changes to one or more self-propelled work vehicle operation settings.

13. The method of claim 1, wherein the one or more requested actions performed at the identified self-propelled work vehicle comprise selective user access, or prevention thereof, with respect to specified portions of the identified self-propelled work vehicle.

14. A system comprising:

a host server comprising one or more hardware processors and data storage hardware, configured to:

establish an authentication network between the host server and one or more user computing devices on a first end, and between the host server and one or more self-propelled work vehicles on a second end, wherein each of the one or more user computing devices is associated with at least one authentication key;

receive a first message from a first device of the one or more user computing devices, wherein the first message comprises one or more requested actions by an identified self-propelled work vehicle of the one or more self-propelled work vehicles and is associated with an authentication key; and upon verifying authenticity of the first message, transmit the first message to a machine computing device associated with the identified self-propelled work vehicle;

the machine computing device configured:

upon verifying authenticity of the first message and the one or more requested actions, to conditionally generate a second message comprising a confirmation challenge;

receive a third message comprising data provided via the first device in reply to one or more challenge-specific parameters associated with the confirmation challenge; and upon verifying authenticity of the data in the third message, to generate one or more control signals causing the one or more requested actions to be automatically performed with respect to the identified self-propelled work vehicle.

15. The system of claim 14, wherein the host server is configured, upon verifying authenticity of the first message at the host server, to provide a host signature to the first message which is then transmitted to the machine computing device.

16. The system of claim 15, wherein verifying authenticity of the first message and the one or more requested actions at the machine computing device comprises verifying a first device signature using the authentication key and the host signature.

17. The system of claim 14, wherein the second message is transmitted from the machine computing device to the host server, and further transmitted from the host server to the first device.

18. The system of claim 17, wherein the one or more challenge-specific parameters are associated with the confirmation challenge at the machine computing device.

19. The system of claim 14, wherein:

upon transmitting the first message from the host server to the machine computing device associated with the identified self-propelled work vehicle, the machine computing device is awakened from a first state to a second state; and upon failing to verify the authenticity of the first message and the one or more requested actions at the machine computing device, or the authenticity of the data in the third message, the machine computing device returns from the second state to the first state.

20. The system of claim 14, wherein:

the machine computing device comprises a telematics unit and a controller;

the telematics unit is awakened from the first state to the second state to receive the first message;

the telematics unit in the second state further awakens the controller; and the controller, upon verifying the authenticity of the first message and the one or more requested actions, further conditionally generates the second message comprising the confirmation challenge.

* * * * *